Nov. 3, 1936. J. J. TAYLOR 2,059,413
CABLE CLAMP
Filed Dec. 10, 1935

Inventor
John J. Taylor
By *Alpheus J. Crane* Attorney

Patented Nov. 3, 1936

2,059,413

UNITED STATES PATENT OFFICE 2,059,413

CABLE CLAMP

John J. Taylor, Wadsworth, Ohio, assignor to The Ohio Brass Company, Mansfield, Ohio, a corporation of New Jersey Application December 10, 1935, Serial No. 53,780

8 Claims. (Cl. 24—135)

This invention relates to clamps for electrical conductors or other cables and has for one of its objects the provision of a clamp which will grip a cable sufficiently to withstand the full load on the cable without injuring the cable or decreasing the ultimate strength thereof.

A further object of the invention is to provide a cable clamp which will be light in weight, economical to manufacture, easy to install and which shall be of improved construction and operation.

Other objects and advantages will appear from the following description.

The invention is exemplified by the combination and arrangement of parts shown in the accompanying drawing and described in the following specification, and it is more particularly pointed out in the appended claims.

In the drawing:—

Figure 1:
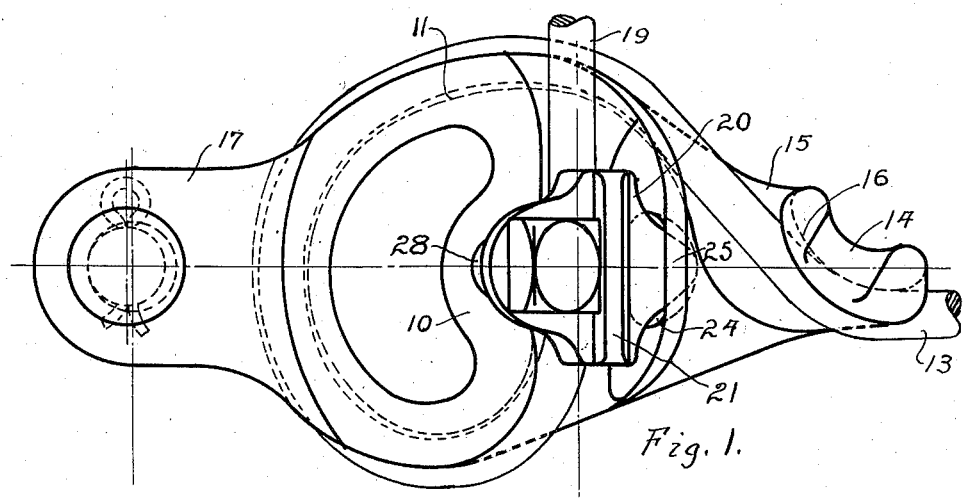
Fig. 1 is a plan of a cable clamp showing one embodiment of the present invention.
Figure 2:
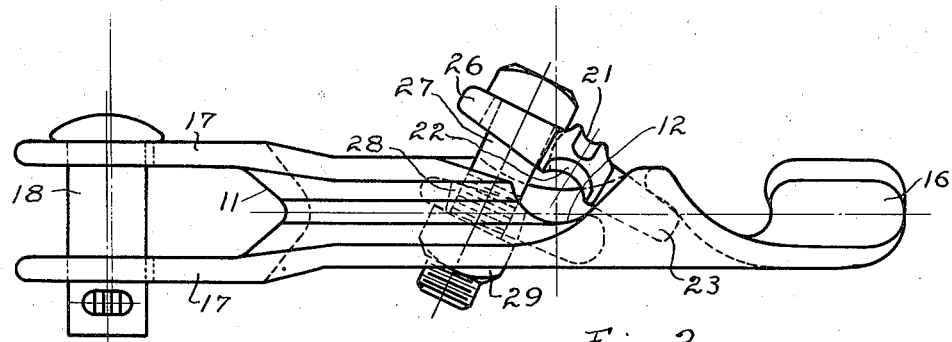
Fig. 2 is an elevation of the clamp shown in Fig. 1.

The clamp comprises a main body member 10 having a peripheral cable seat 11 which is V-shaped in section as shown in Fig. 2. The peripheral portion of the seat 11 terminates at one edge of the body member and is continued by a laterally opening seat portion 12 which extends across the body member at right angles to the taut end of the cable, indicated at 13. The taut end of the cable extends about a stop 14 carried by an arm 15 extending radially from the main body of the clamp and having a seat portion 16 curved in a reverse direction from the peripheral seat 11 so that the cable is bent about the stop in a reverse direction to the direction of curvature about the peripheral seat and extends away from the clamp along a line which, if extended backwardly, passes through the body of the clamp within the peripheral seat 11. Ears 17 extend away from the seat body in the opposite direction from the arm 15, the ears being provided with a pin 18 or other suitable device for securing the clamp to its support. It will be seen that by the arrangement shown the main body of the clamp will be held in axial alignment with the taut end of the cable so that the tension on the clamp will be evenly distributed and the center of gravity of the clamp will be approximately on the line of tension of the cable. The seats 11, 12 and 16 are all open at one side so that it is easy to wind the cable upon the clamp. If this is done before the pin 18 is inserted in place, it is not necessary to thread the end of the cable through any portion of the clamp.

The slack end of the cable 19 lies in the seat 12 and is held in place by a keeper 20 having cable-engaging seats 21 and 22 at opposite sides thereof. The keeper 20 is provided with a tongue 23 which extends into an opening 24 in the clamp body and engages a fulcrum rib 25 for holding one end of the keeper. The opposite end of the keeper is provided with a perforated ear 26 through which a bolt 27 extends, the bolt passing through an opening 28 in the web portion of the keeper body and having a nut 29 for tightening the bolt to draw the keeper against the slack end of the cable and thus grip the cable in place. The seats 21 and 22 are shaped to cooperate with cables of different sizes. It will be noted that the seat 21 is intended for cables of small diameters and the seat 22 for cables of larger diameters. The seat 11 is V shaped so as to accommodate cables of a large range of sizes. The arrangement makes it possible to grip cables of various sizes from small wires up to the maximum diameter for which the clamp is designed.

It has been found in practice that the seat arrangement shown not only accommodates cables of a large range of sizes but provides gripping means which will withstand the greatest tensions that can be placed upon the clamp by high strength cables of maximum diameter for which the device is designed. The arrangement provides a very long snubbing seat within a small compass. The stop 14 not only provides additional surface for engaging the cable but directs the cable about a longer periphery than is the case where the cable leaves the seat in a tangential direction. It also directs the tension through the central portion of the clamp body so as to give a better distribution of the material of the clamp, making it possible to use a lighter clamp for a given strength.

By placing the keeper in a position to hold a transverse portion of the cable, advantage is taken of the central portion of the clamp body to provide the gripping seat and full advantage is taken of the entire peripheral seat for snubbing the cable ahead of the portion gripped by the keeper. The force of tension is largely taken up by the friction in the snubbing seat so that the portion of the cable held by the keeper is subjected only to a comparatively light tension and, consequently, can be held more effectively since there is no stretching of the cable and consequent decrease in diameter at the point where it is gripped. The keeper engages the cable at a point between its fulcrum support and the holding bolt so that a lever action is provided, increasing the pressure of the bolt exerted on the cable.

I claim:—

1. A cable clamp having an arcuate snubbing seat, anchoring means for said clamp at one side of said seat, means on said clamp at one end of said seat for gripping a cable wound on said seat, a stop adjacent the other end of said seat about which said cable is bent in a reverse direction from its direction of curvature about said seat, said stop being attached to said seat at the side thereof opposite said anchoring means so as to engage the taut end of said cable, said stop directing the taut end of the cable away from said clamp along a line, the backward extension of which passes through said clamp and intersects the arc formed by the bottom of said seat.

2. A cable clamp comprising a body portion having an arcuate snubbing seat forming a loop extending about the periphery of said body portion, a gripping seat extending across one face of said body portion, anchoring means for said clamp at one side of said body portion and means at the side of said body portion opposite said anchoring means for directing the taut end of a cable held by said clamp away from said clamp in a direction substantially normal to said gripping seat and in the direction of a line extending from said anchoring means to said directing means and bisecting said loop.

3. A cable clamp comprising a body portion having a peripheral snubbing seat, anchoring means for said clamp at one side of said body portion, a stop adjacent one end of said seat but spaced therefrom for directing a cable away from said seat, said stop being secured to said body portion at the side thereof opposite said anchoring means, said cable being bent about said stop in a direction reverse to the direction of curvature of said cable about said seat and a gripping seat adjacent the other end of said snubbing seat and extending across the lateral face of said body portion.

4. A cable clamp comprising a main body portion having a peripheral snubbing seat thereon, an arm extending from one side of said body portion and having a stop thereon about which the taut end of a cable passes from said snubbing seat and by which the taut end of said cable is bent in a reverse direction to the direction of curvature of said cable about said snubbing seat, means at the side of said main body portion opposite said arm for securing said clamp to a support, the end of said snubbing seat opposite said stop merging into a clamping seat on the lateral face of said body portion and extending across said face in a direction substantially normal to the taut end of said cable.

5. A cable clamp comprising a main body portion having a peripheral snubbing seat thereon, an arm extending from said body portion adjacent one end of said snubbing seat and having a stop thereon spaced from the end of said snubbing seat about which stop the taut end of a cable wound about said snubbing seat is bent in a direction reverse to the direction of curvature of said cable about said snubbing seat, a pivotal support for said clamp at the opposite side of said main body portion from said stop, said main body portion having a transversely extending clamping seat thereon forming an extension of said snubbing seat and means for holding the slack end of said cable against said clamping seat.

6. A cable clamp having a snubbing seat thereon, a clamping seat for holding the slack end of a cable wound about said snubbing seat, a keeper for holding the slack end of said cable against said clamping seat, a fulcrum on said clamp for engaging one end of said keeper, threaded means for engaging the other end of said keeper and a seat on said keeper between the ends thereof for engaging said cable.

7. A cable clamp comprising a main body portion having a snubbing seat thereon, a clamping seat disposed at one end of said snubbing seat and forming a continuation thereof, a keeper for holding said cable on said clamping seat, said body portion having a pocket therein for receiving one end of said keeper, the edge of said pocket forming a fulcrum for said keeper, the other end of said keeper having an opening therethrough, a bolt extending through said opening and through an opening in the body of said clamp, said keeper having a cable-engaging seat thereon between the ends thereof for pressing the cable against said clamping seat.

8. A cable clamp comprising a main body portion having a peripheral snubbing seat thereon, a clamping seat on one lateral face of said body portion and forming a continuation of one end of said snubbing seat, a keeper for holding the slack end of the cable against said clamping seat, a fulcrum member on said body portion for engaging one end of said keeper, a bolt carried by said body portion and engaging the other end of said keeper, said keeper having seats at opposite sides thereof between its ends, said seats being adapted for the engagement of cables of different sizes to accommodate a large range of cable sizes held by said clamp.

JOHN J. TAYLOR.